United States Patent [19]

Glickstein

[11] Patent Number: 5,414,992
[45] Date of Patent: May 16, 1995

[54] AIRCRAFT COOLING METHOD

[75] Inventor: Marvin R. Glickstein, North Palm Beach, Fla.

[73] Assignee: United Technologies Corporation, Hartford, Conn.

[21] Appl. No.: 103,602

[22] Filed: Aug. 6, 1993

[51] Int. Cl.⁶ .............................................. F02C 7/18
[52] U.S. Cl. .................... 60/39.02; 60/39.07; 60/39.83; 62/87; 62/402
[58] Field of Search ............... 60/39.02, 39.07, 39.83, 60/728; 62/402, 87

[56] References Cited

U.S. PATENT DOCUMENTS

| | | | |
|---|---|---|---|
| 3,528,250 | 9/1970 | Johnson | 60/728 |
| 4,120,150 | 10/1978 | Wakeman | 60/728 |
| 5,056,335 | 10/1991 | Reminger et al. | 62/402 |
| 5,161,365 | 11/1992 | Wright | 60/39.02 |
| 5,176,814 | 1/1993 | Spadaccini et al. | 208/48 Q |
| 5,232,672 | 8/1993 | Spadaccin et al. | 422/198 |
| 5,267,608 | 12/1993 | Coffinberry | 165/70 |

*Primary Examiner*—Richard A. Bertsch
*Assistant Examiner*—William J. Wicker

[57] ABSTRACT

A method for supplying cooling air on vehicles such as high speed aircraft includes diverting high pressure air from the compressor section of a gas turbine engine, cooling this air in a heat exchanger, and expanding the diverted high pressure air through an auxiliary turbine. Coolant in the heat exchanger may be inlet ram air, fan air, or aircraft fuel (which may be endothermic), and the coolant is ultimately introduced into the engine downstream of the compressor section. An auxiliary compressor may be used to further compress the diverted high pressure air or coolant prior to the flowing thereof through the heat exchanger, and one or more auxiliary turbines may be used to power the auxiliary compressor, or mechanical accessories on the vehicle.

7 Claims, 6 Drawing Sheets

AIRCRAFT COOLING METHOD

FIELD OF THE INVENTION

This invention relates to a method for cooling aircraft components and exhaust systems of gas turbine engines.

BACKGROUND OF THE INVENTION

Survivability and structural requirements in advanced aircraft require cooling and thermal management of aircraft and propulsion structures. Conventional methods for propulsion system cooling in current aircraft engines typically employ either engine fuel, or air from one of the various sources in the propulsion system as a coolant. Among the traditional sources of cooling air are 1) ram air from the inlet, 2) air from the fan (in turbofan engines), or 3) air from the high compressor.

These sources for cooling air have generally been adequate for cooling aircraft components up to this time, the cooling air being primarily used for maintaining structural integrity of engine components. Although cooling air diverted from the aforementioned sources impacts overall engine performance, the cooling requirements have heretofore been achieved with only minimal impact on engine performance. However, as the amount of electronic and other heat generating equipment carried on aircraft has increased, the requirement for cooling system capability has correspondingly increased. In addition, as aircraft speeds and capabilities increase beyond about Mach 3, the demands on the cooling systems of aircraft increase as well. These increased speeds and capabilities require cooling of aircraft components such as leading edges of the airframe, and certain parts of the engine exposed to high temperature combustion products. The increasingly stringent requirements for future vehicle/engine systems will require improved sources of low temperature coolants. What is needed is a method of providing greater cooling capability for aircraft components and engines without substantially increasing the amount of cooling air diverted from the traditional sources of cooling air.

SUMMARY OF THE INVENTION

It is therefore an object of the present invention to provide a method for increasing the cooling capability for vehicle components, and engine components of the vehicle.

Another object of the present invention is to provide a method for increasing the cooling capability for aircraft components and engines without substantially increasing the amount of cooling air diverted from the traditional sources of cooling air.

Another object of the present invention is to provide a method for producing cooling air on aircraft that fly at speeds in excess of Mach 3.

According to the present invention a method is disclosed that provides a supply of cooling air which can be used for cooling vehicle components and engine components of the vehicle, especially vehicles such as high speed aircraft. The method includes diverting high pressure air from the compressor section of a gas turbine engine, cooling this air in a heat exchanger, and expanding the diverted high pressure air through an auxiliary turbine. The coolant in the heat exchanger may be inlet ram air, fan air, or aircraft fuel which may be endothermic. The coolant is ultimately introduced into the engine downstream of the compressor section, thereby recovering the heat energy that was absorbed from the diverted high pressure air. In some embodiments of the present invention, power from the auxiliary turbine is used to drive mechanical accessories on the vehicle. Some other embodiments of the present invention use the power from the auxiliary turbine to drive an auxiliary compressor which further compresses the diverted high pressure air, and one embodiment uses the power from the auxiliary turbine to drive an auxiliary compressor which further compresses the ram air. One embodiment includes expanding the fuel through a second auxiliary turbine and using the work extracted therefrom to provide additional power for the auxiliary compressor.

The foregoing and other features and advantages of the present invention will become more apparent from the following description and accompanying drawings.

DETAILED DESCRIPTION OF THE INVENTION

Figure 1:
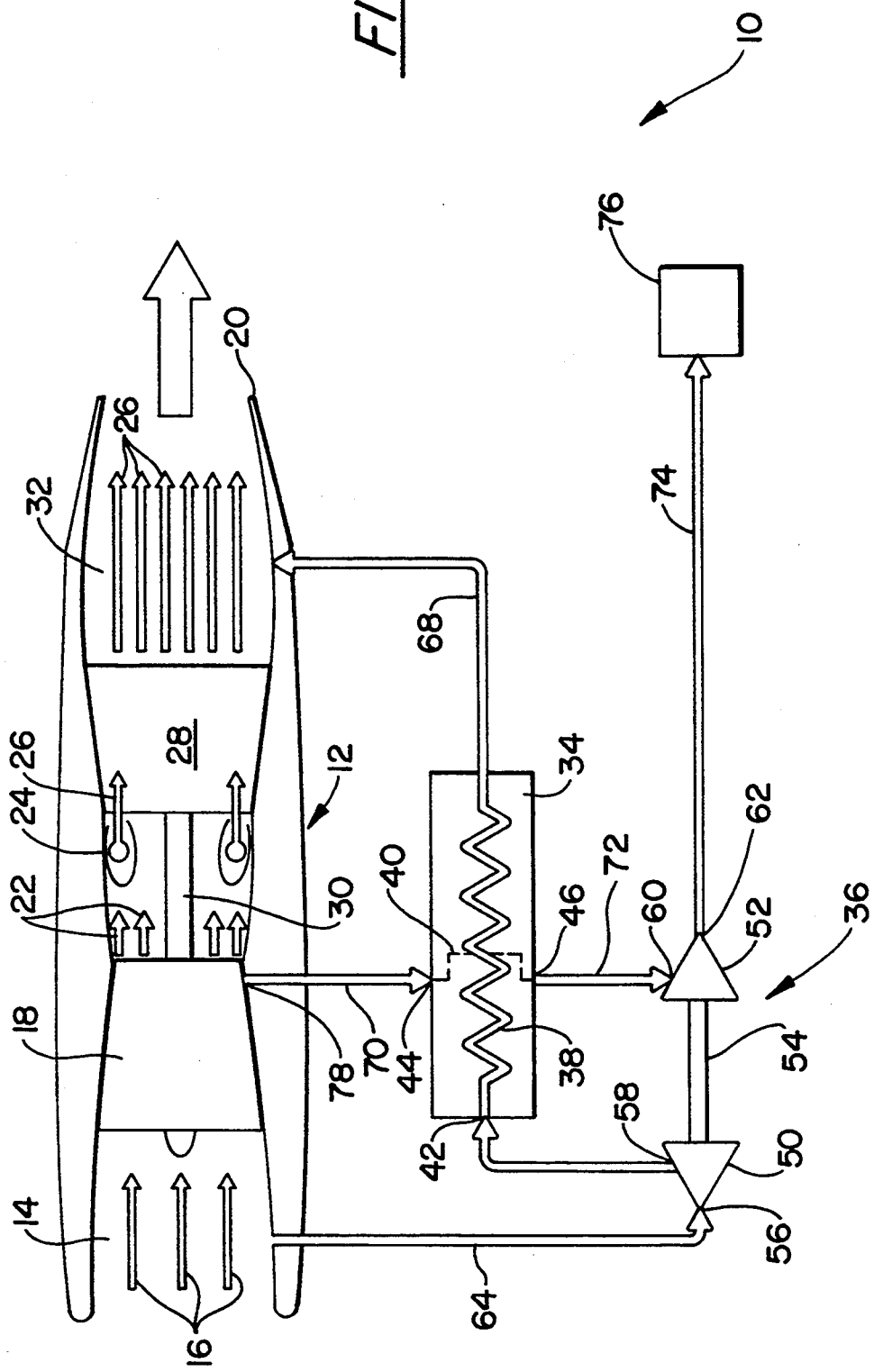
FIG. 1 is a schematic view of the components of the first embodiment of the method of the present invention for a vehicle powered by a turbojet gas turbine engine.

The method of the present invention is for generating cooled air for cooling components of aircraft vehicles that incorporate large amounts of electronic or other heat generating equipment on board, or for cooling components of a high speed vehicle 10, such as an aircraft that flies at supersonic speeds in excess of Mach 3. Practicing this invention requires at least one gas turbine engine 12 in the vehicle, such as the engine shown in FIG. 1.

This engine, which may be a turbojet 12, includes, in serial flow arrangement, an engine inlet section 14 for receiving ambient air 16 and delivering the ambient air 16 to the compressor section 18, and aft of the inlet section 14 is the compressor section 16 for compressing the ambient air 16 thereby producing compressed air 22. Aft of the compressor section 18 is a combustor section 24 for mixing fuel with the compressed air 22 and igniting the fuel and compressed air 22 to produce combustion products 26. Aft of the combustion section 24 is a turbine section 28 for expanding the combustion products 26 and driving the compressor section 18 via an engine shaft 30, and aft of the turbine section 28 is an exhaust section 32 for conveying the combustion products 26 from the turbine section 28, through the nozzle 20, and out of the aft end of the gas turbine engine 12.

As shown in FIG. 1, the vehicle 10 also includes a heat exchanger 34 and an auxiliary unit 36. The heat exchanger 34 has first 38 and second 40 flow paths extending therethrough, and each flow path 38, 40 has an inlet 42, 44 and an outlet 46, 48. The auxiliary unit 36 includes an auxiliary compressor 50 and an auxiliary turbine 52, and the auxiliary turbine 52 is connected to the auxiliary compressor 50 by an auxiliary shaft 54 to provide power thereto. The auxiliary compressor 50 has an inlet 56 and an outlet 58, and the auxiliary turbine likewise has an inlet 60 and an outlet 62.

The inlet 56 of the auxiliary compressor 50 is connected by a conduit 64 to the inlet section 14 of the engine 12 to receive ram air 16 at ambient conditions therefrom. The outlet of the auxiliary compressor 58 is connected by a second conduit 66 to the inlet 42 of the first flow path. The outlet 48 of the first flow path is connected by a third conduit 68 to the exhaust section 32 of the engine 12 to deliver the air exiting the first flow path 38 to the exhaust section 32.

The inlet 44 of the second flow path is connected by a fourth conduit 70 to the compressor section 18 to receive compressed air therefrom, and the outlet 46 of the second flow path is connected by a fifth conduit 72 to the inlet 60 of the auxiliary turbine 52 to deliver compressed air exiting the second flow path 40 thereto. The outlet 62 of the auxiliary turbine 52 is connected to a sixth conduit 74 which routes the compressed air exiting the outlet 62 of the second flow path to the components 76 of the vehicle or engine which need to be cooled.

In operation, a first portion of the ambient ram air 16 from the engine inlet section 14 is diverted therefrom through the first conduit 64 and delivered to the inlet 56 of the auxiliary compressor. The first portion of ambient ram air 16 is then compressed in the auxiliary compressor 50, thereby increasing the pressure and temperature of the first portion of ambient ram air exiting the outlet 58 of the auxiliary compressor. A second portion of air, this being compressed air 22, is diverted from the compressor section 18 of the engine 12 through a compressor bleed 78. This second portion of compressed air is cooled, and the first portion is heated, as follows.

The first portion flowing from the auxiliary compressor 56 is directed to the inlet 42 of the first flow path of the heat exchanger 34 and flows through the first flow path 38 thereof, and the second portion flowing from the compressor section 18 through the fourth conduit 70 is delivered to the inlet 44 of the second flow path of the heat exchanger 34 and flows through the second flow path 40 thereof. Within the heat exchanger 34, the second portion is cooled simultaneously with the heating of the first portion through the transfer of heat energy from said second portion to the first portion. The first portion then exits the first flow path 38 through the outlet thereof 48, and the second portion then exits the second flow path 40 through the outlet 46 thereof.

The second portion exiting the heat exchanger 34 is delivered to the auxiliary turbine 52 through the fifth conduit 72 and expanded through the auxiliary turbine 52, thereby reducing the temperature of the second portion and producing work to drive the auxiliary compressor 50 via the auxiliary shaft 54. The second portion exiting the auxiliary turbine 52 is then routed through the sixth conduit 74 to the components 76 of the vehicle or engine which require cooling, and used to cool those components 76. The first portion exiting the heat exchanger 34 is delivered through the third conduit 68 to the exhaust section 32 and discharged into the combustion products 76.

As those skilled in the art will readily appreciate, compression of the ram air 16 prior to its use in the heat exchanger 34 as a coolant allows introduction of the heated ram air into the engine exhaust section, thereby improving engine performance. The compression requirement for the ambient ram air must be at least equal to the engine pressure ratio (the pressure of the combustion products in the exhaust section divided by the pressure of the ambient ram air in the inlet section) plus the pressure loss across the heat exchanger 34. The balance between available turbine power and ram compressor power determines the mass flow of ram air flow available for cooling.

Figure 2:
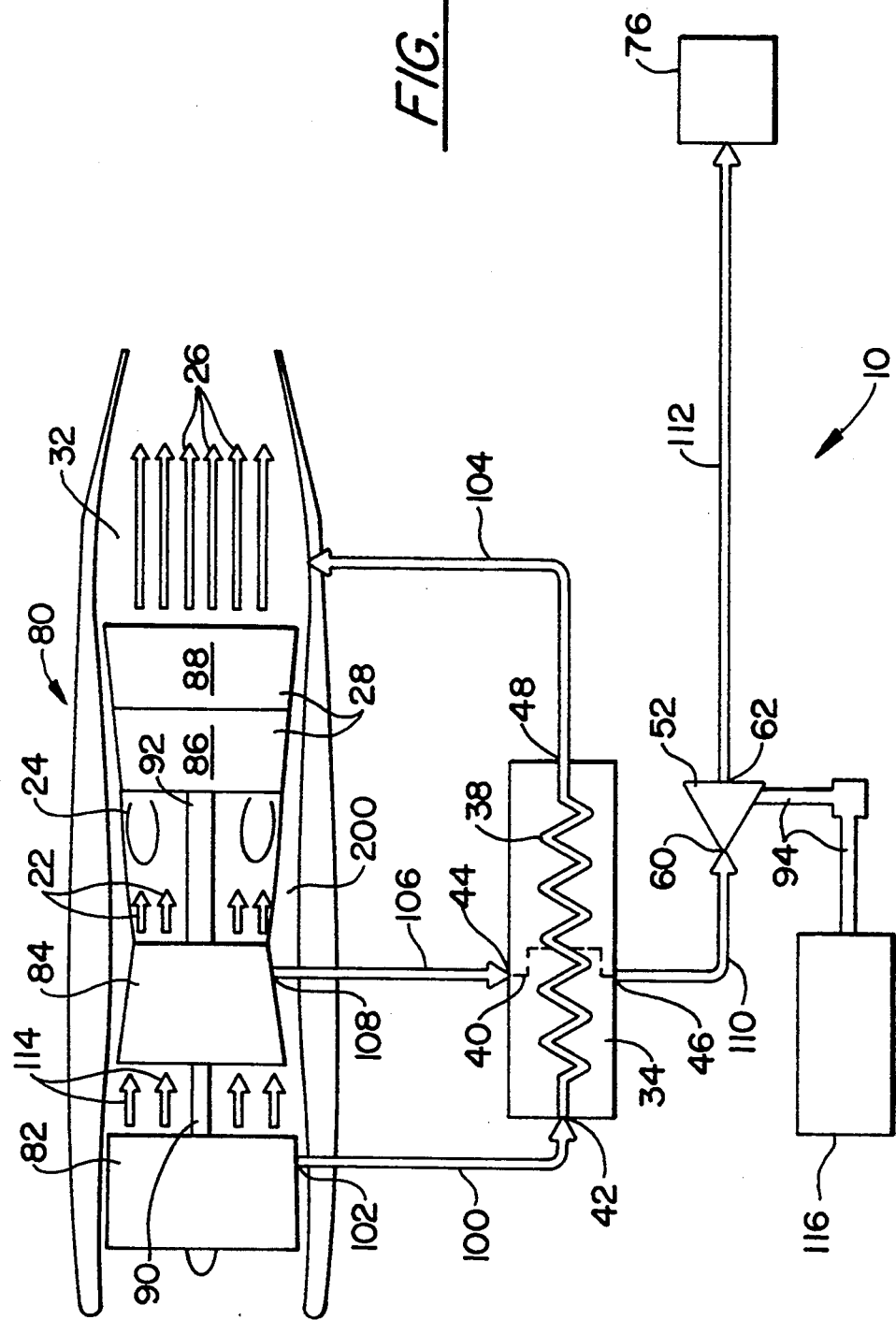
FIG. 2 is a schematic view of the components of the second embodiment of the method of the present invention for a vehicle powered by a turbofan gas turbine engine.

FIG. 2 illustrates a second embodiment of the method of the present invention modified to accommodate use on vehicles which use turbofan gas turbine engines. As compared to the turbojet, the compressor section 18 of the turbofan 80 has, in serial flow arrangement, a low pressure compressor, or "fan" 82, and a high pressure compressor 84. Likewise the turbine section 28 of the turbofan 80 has in serial flow arrangement, a high pressure turbine 86 and a low pressure turbine 88. A bypass duct 200 connects the exhaust section 32 to the outlet of the low compressor 82 to permit fan air 114 to bypass the high compressor 84, combustion section 24, and turbine section 28. The low pressure turbine 88 drives the fan 82 via the low shaft 90 which connects the low pressure turbine 88 to the fan 82, and the high pressure turbine 86 drives the high compressor 84 via the high shaft 92 which connects the high pressure turbine 86 to the high compressor 84. Otherwise, the elements of the turbofan 80 are the same as those shown for the turbojet in FIG. 1, except for the conduits.

As in the first embodiment, the vehicle 10 includes a heat exchanger 34 which is likewise similar to the heat exchanger 34 of the first embodiment. An auxiliary turbine 52 having an inlet 60 and an outlet 62 is likewise provided, and the auxiliary turbine 52 is connected to a power take-off shaft 94 to provide mechanical energy to power accessories on the vehicle 10 as desired.

A first conduit 100 is connected at one end to a fan bleed 102 and at the other end to the inlet 42 of the first flow path. The outlet 48 of the first flow path 38 is connected by a second conduit 104 to the exhaust section 32 of the engine to deliver the air exiting the first flow path 38 to the exhaust section 32.

The inlet 44 of the second flow path is connected by a third conduit 106 to a high pressure compressor bleed 108 to receive compressed air therefrom, and the outlet 46 of the second flow path 40 is connected by a fourth conduit 110 to the inlet 60 of the auxiliary turbine 52 to deliver compressed air exiting the second flow path 40 thereto. The outlet 62 of the auxiliary turbine 52 is connected to a fifth conduit 112 which routes the compressed air exiting the outlet 62 of the auxiliary turbine to the components 76 of the vehicle or engine which need to be cooled.

In operation, a first portion of the fan air 114 from the low pressure compressor 82 is diverted therefrom through the fan bleed 102 and the first conduit 100, and delivered to the inlet 42 of the first flow path 38 of the heat exchanger and flows through the first flow path 38 thereof. A second portion of air, this being high compressor air 22, is diverted from the high pressure compressor 84 through a high compressor bleed 108. The second portion flowing from the high compressor 84 through the third conduit 106 is delivered to the inlet 44 of the second flow path of the heat exchanger 34 and flows through the second flow path 40 thereof. Within the heat exchanger 34, the second portion is cooled simultaneously with the heating of the first portion as described above. The first portion then exits the first flow path 38 through the outlet 48 thereof, and the second portion then exits the second flow path 40 through the outlet 46 thereof.

The second portion exiting the heat exchanger 34 is delivered to the auxiliary turbine 52 through the fourth conduit 110 and expanded through the auxiliary turbine 52, thereby reducing the temperature of the second portion and producing work to power accessories 116 on the vehicle via the power take-off shaft 94. The first portion exiting the heat exchanger 34 is delivered through the second conduit 104 to the exhaust section 32 and discharged into the combustion products 26, or used to cool components with noncritical requirements. The second portion exiting the auxiliary turbine 52 is then routed through the fifth conduit 112 to the components 76 of the vehicle or engine which require cooling, and used to cool those components.

As those skilled in the art will readily appreciate, the heated fan air, which is mixed into the exhaust stream 26, produces a net increase in thrust as compared to merely bleeding high compressor air and cooling it with some other source. Alternatively, the heated fan air may be used to cool components with noncritical requirements. The cooled high pressure air that has been expanded through the auxiliary turbine 52 to the lowest pressure level allowed by the system achieves a substantially reduced temperature. This cold expanded air is then available for critical component 76 cooling, while the power extracted by the auxiliary turbine 52 via the power take-off shaft 94 can be used to satisfy aircraft 10 power requirements, instead of using mechanical power extraction from the engine 80.

Figure 3:
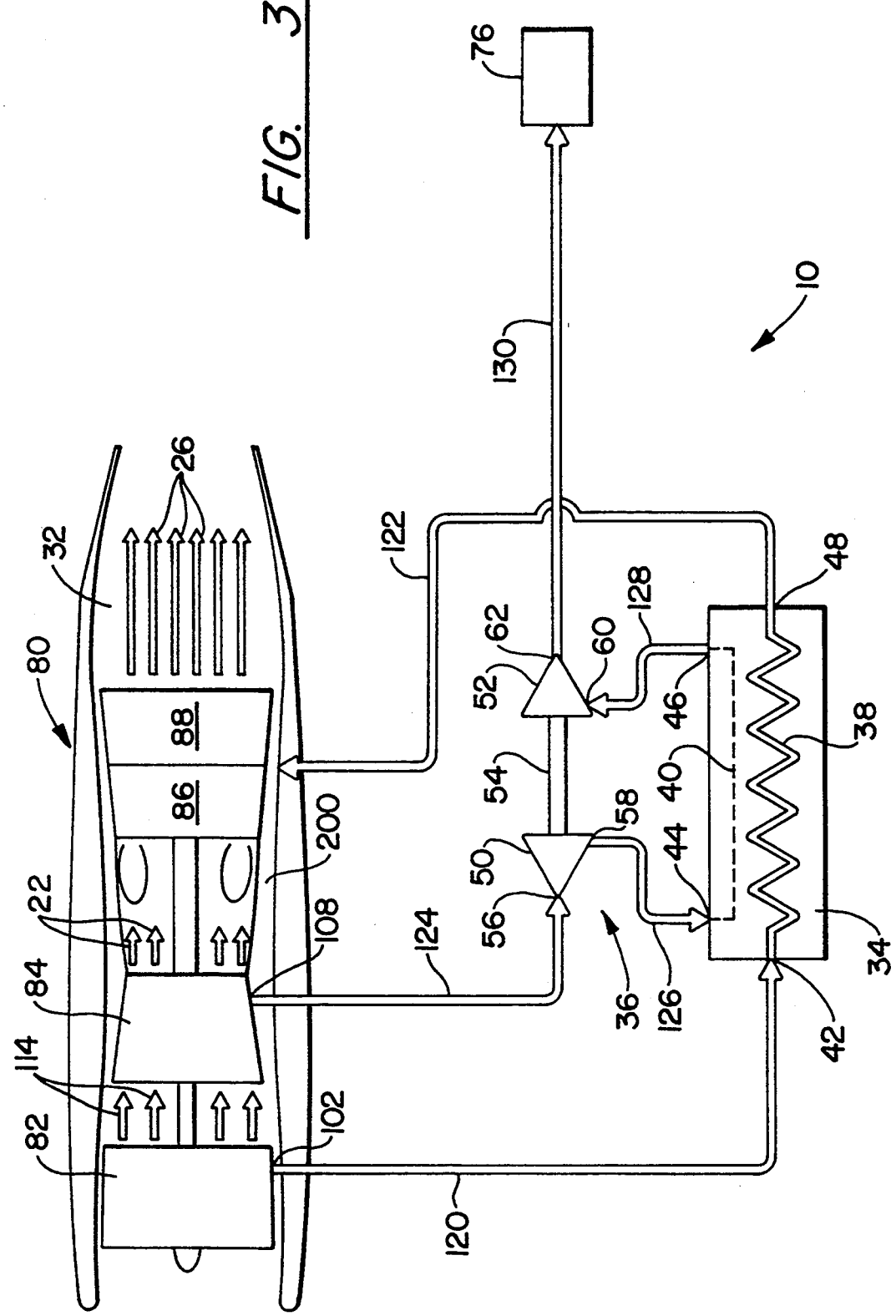
FIG. 3 is a schematic view of the components of the third embodiment of the method of the present invention for a vehicle powered by a turbofan gas turbine engine.

FIG. 3 illustrates a third embodiment of the method of the present invention, also for use on vehicles which use turbofan gas turbine engines. As FIG. 3 shows, the elements of the turbofan 80 are the same as those shown for the turbofan in FIG. 2, and therefore the reference numerals are the same. As in the second embodiment, the vehicle includes a heat exchanger 34 which is likewise similar to the heat exchanger 34 of the second embodiment. An auxiliary unit 36 is also provided, including an auxiliary compressor 50 and an auxiliary turbine 52, and the auxiliary turbine 52 is connected to the auxiliary compressor 50 by an auxiliary shaft 54 to provide power thereto. The auxiliary compressor 50 has an inlet 56 and an outlet 58, and the auxiliary turbine 52 likewise has an inlet 60 and an outlet 62.

A first conduit 120 is connected at one end to the fan bleed 102 and at the other end to the inlet 42 of the first flow path. The outlet 48 of the first flow path is connected by a second conduit 122 to the exhaust section 32 of the engine 80 to deliver the air exiting the first flow path 38 to the exhaust section 32. The inlet 56 of the auxiliary compressor 50 is connected by a third conduit 124 to the high compressor bleed 108 to receive high pressure compressed air therefrom. The outlet 58 of the auxiliary compressor 50 is connected by a fourth conduit 126 to the inlet 44 of the second flow path 40. The outlet 46 of the second flow path 40 is connected by a fifth conduit 128 to the inlet 60 of the auxiliary turbine 52 to deliver compressed air exiting the second flow path 40 thereto. The outlet 62 of the auxiliary turbine 52 is connected to a sixth conduit 130 which routes the compressed air exiting the outlet 62 of the auxiliary turbine 52 to the components 76 of the vehicle or engine which need to be cooled.

In operation, a first portion of the fan air 114 from the low pressure compressor 82 is diverted therefrom through a fan bleed 102 and the first conduit 120, and delivered to the inlet 42 of the first flow path of the heat exchanger 34 and flows through the first flow path 38 thereof. A second portion of air, this being high compressor air, is diverted from the high pressure compressor 84 through a high compressor bleed 108. The second portion flowing from the high compressor 84 through the third conduit 124 is delivered to the inlet 56 of the auxiliary compressor. The second portion is then compressed in the auxiliary compressor 50, thereby increasing the pressure and temperature of the second portion exiting the outlet 58 of the auxiliary compressor. The second portion flowing from the auxiliary compressor 50 through the fourth conduit 126 is delivered to the inlet 44 of the second flow path of the heat exchanger 34, and flows through the second flow path 40 thereof. Within the heat exchanger 34, the second portion is cooled simultaneously with the heating of the first portion as described above. The first portion exits the first flow path 38 through the outlet 48 thereof, and the second portion exits the second flow path 40 through the outlet 46 thereof.

The second portion exiting the heat exchanger 34 is delivered to the auxiliary turbine 52 through the fifth conduit 128 and expanded through the auxiliary turbine 52, thereby reducing the temperature of the second portion and producing work to drive the auxiliary compressor 50 via the auxiliary shaft 54. The second portion exiting the auxiliary turbine 52 is then routed through the sixth conduit 130 to the components 76 of the vehicle or engine which require cooling, and used to cool those components. The first portion exiting the heat exchanger 34 is delivered through the second conduit 122 to the exhaust section 32 via the bypass duct 200 and discharged into the combustion products 26.

The auxiliary compressor 50 is used to supercharge the high compressor bleed air 22, thus heating it to higher temperatures prior to cooling it with low pressure fan bleed air 114. This allows more heat extraction from the compressed air diverted from the high pressure compressor bleed, thus yielding lower temperatures when the high pressure compressor bleed air is finally expanded to low pressure through the auxiliary turbine 52. The compression ratio of the auxiliary compressor 50 is preferably significantly less than the expansion ratio of the turbine 52, so that all of the power required for compressing the air diverted from the high pressure compressor can be supplied by the auxiliary turbine 52.

Figure 4:
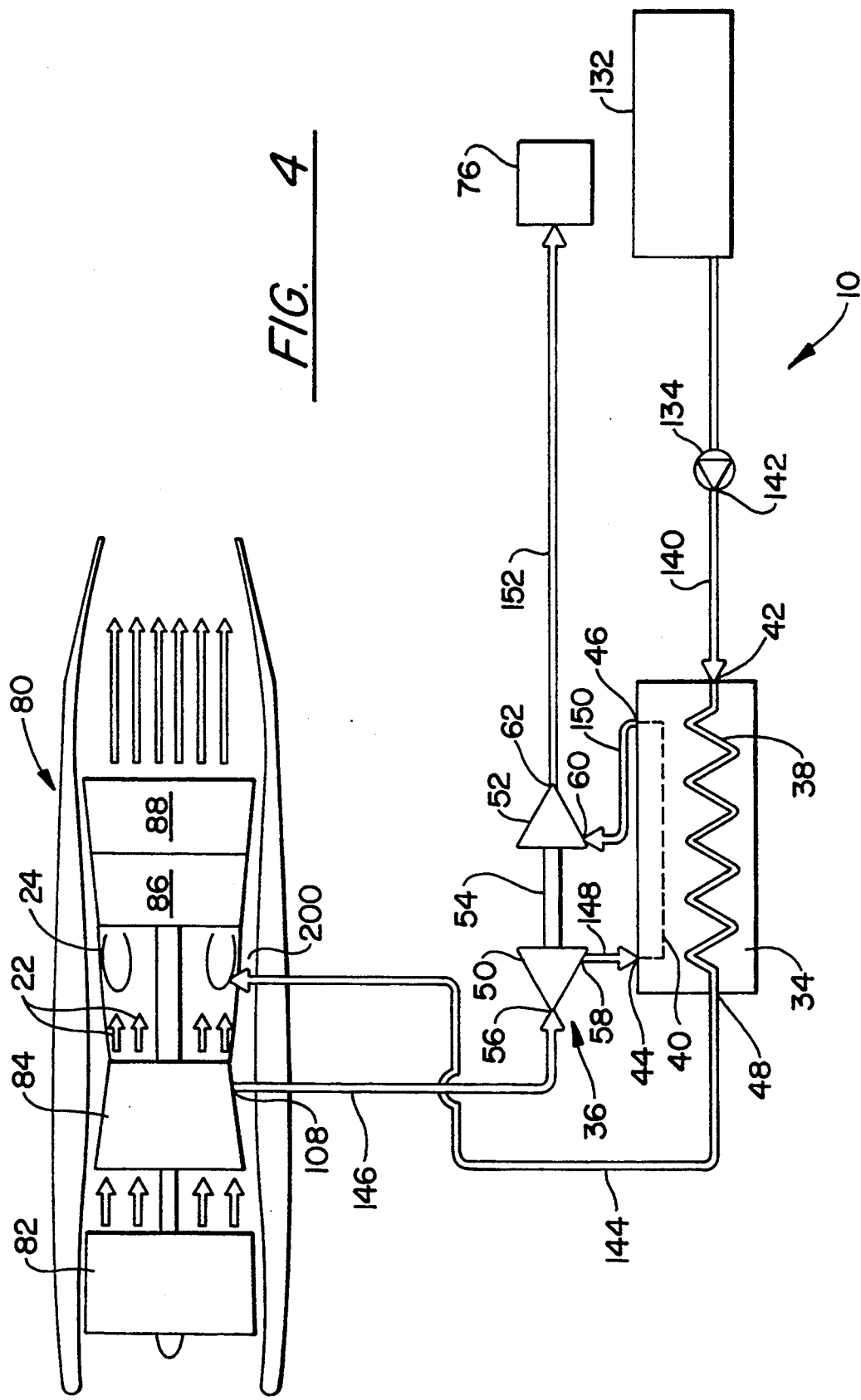
FIG. 4 is a schematic view of the components of the fourth embodiment of the method of the present invention for a vehicle powered by a turbofan gas turbine engine.

FIG. 4 illustrates a fourth embodiment of the method of the present invention for use on a vehicle 10 which uses either turbojet or turbofan gas turbine engines. Although the fourth embodiment is shown and described in terms of a turbofan, those skilled in the art will readily appreciate that this method is also applicable to a turbojet, since neither ram air nor fan air is used as the coolant in this fourth embodiment. Again, the elements of the turbofan 80 are the same as those shown for the turbofan 80 in FIG. 2, and the vehicle 10 includes a heat exchanger 34 which is similar to the heat exchanger 34 of the second embodiment. The elements of the auxiliary unit 36 likewise are identified by the same reference numerals used to identify similar elements in FIG. 3.

In addition to the elements of the first three embodiments, the fourth embodiment of the method of the present invention uses a fuel source 132 connected to a fuel pump 134, such as the type typically used for supplying fuel to the combustion section of gas turbine engines. A first conduit 140 is connected at one end to the fuel pump outlet 142 and at the other end to the inlet 42 of the first flow path 38. The outlet 48 of the first flow path is connected by a second conduit 144 to the combustion section 24 of the engine 80 to deliver the fuel exiting the first flow path 38 to the combustion section 24.

The inlet 56 of the auxiliary compressor 50 is connected by a third conduit 146 to the high compressor bleed 108 to receive high pressure compressed air therefrom. The outlet 58 of the auxiliary compressor 50 is connected by a fourth conduit 148 to the inlet 44 of the second flow path, and the outlet 46 of the second flow path is connected by a fifth conduit 150 to the inlet 60 of the auxiliary turbine 52 to deliver compressed air exiting the second flow path 40 thereto. The outlet 62 of the auxiliary turbine 52 is connected to a sixth conduit 152 which routes the compressed air exiting the outlet 62 of the auxiliary turbine 52 to the components 76 of the vehicle or engine which need to be cooled.

In operation, fuel from the fuel source 132 is pumped by the fuel pump 134 through the first conduit 140, delivered to the inlet 42 of the first flow path of the heat exchanger 34, and flows through the first flow path 38 thereof. A second portion, that being compressed air from the high compressor 84, is diverted from the high pressure compressor 84 through the high compressor bleed 108. The second portion flowing from the high compressor 84 through the third conduit 146 is delivered to the inlet 56 of the auxiliary compressor. The second portion is then compressed in the auxiliary compressor 50, thereby increasing the pressure and temperature of the second portion exiting the outlet 58 of the auxiliary compressor. Within the heat exchanger 34, the second portion is cooled simultaneously with the heating of the fuel flowing through the first path 38. The fuel then exits the first flow path 38 through the outlet 48 thereof, and the second portion then exits the second flow path 40 through the outlet 46 thereof.

The second portion exiting the heat exchanger 34 is delivered to the auxiliary turbine 52 through the fifth conduit 150 and expanded through the auxiliary turbine 52, thereby reducing the temperature of the second portion and producing work to drive the auxiliary compressor via the auxiliary shaft 54. The second portion exiting the auxiliary turbine 52 is then routed through the sixth conduit 152 to the components 76 of the vehicle or engine which require cooling, and used to cool those components. The fuel exiting the heat exchanger 34 is delivered through the second conduit 144 to the combustion section 24 where it is mixed with compressed air 22 exiting the high compressor 84, ignited, and combusted.

The fourth embodiment of the method of the present invention uses the heat sink capability of the fuel to cool the highly compressed air bled from the high pressure compressor 84 prior to expanding the air through the auxiliary turbine 52. This further expands the capability for generating low temperature air, yielding either lower temperature cooling air, or a larger volume of cooling air at higher temperatures. As gas turbine engine hydrocarbon fuels are developed which have greater thermal stability, the capacity of the fuel to be used as a heat sink improves as well.

Figure 5:
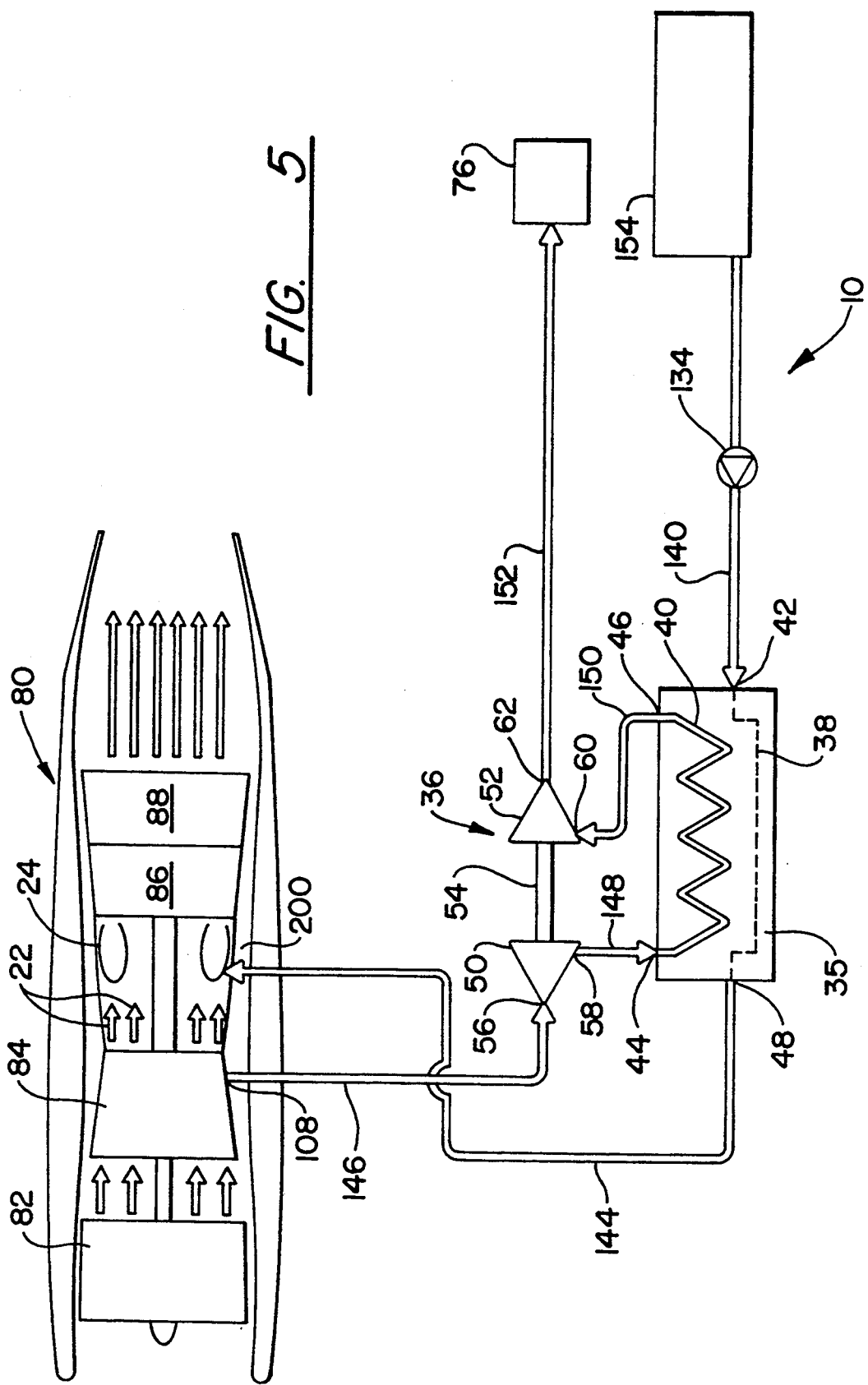
FIG. 5 is a schematic view of the components of the fifth embodiment of the method of the present invention for a vehicle powered by a turbofan gas turbine engine.

In particular, the advent of endothermic fuels allows an improvement to the fourth embodiment, as shown in FIG. 5, the fifth embodiment, in which the fuel source 154 contains an endothermic fuel, such as methylcyclohexane (MCH), and the heat exchanger is also a catalytic thermal reactor. The method of the fifth embodiment is the same as the fourth embodiment, except that the fuel exiting the heat exchanger/reactor 35 is in the form of high pressure gaseous hydrocarbons, and the heat energy absorbed by the fuel in the heat exchanger/reactor is therefore greater, resulting in overall greater cooling of the second portion of air bled from the high compressor 84. The heat exchanger/reactor 35 is a combined air-fuel heat exchanger and catalytic converter. The catalyst, specifically selected for the chosen fuel, is coated or packed within the heat exchanger/reactor 35 in a manner such that the fuel is in intimate contact with the catalyst during heating. The net result, well known in the art and demonstrated in chemical and fuel technology, is that the fuel decomposes into new chemical structures with a large attendant absorption of heat. Most endothermic fuels thus far identified as potential aircraft fuels, which undergo this heat absorption at elevated temperatures (600°–1200° F.), are compatible with the fifth embodiment of the present invention.

Figure 6:
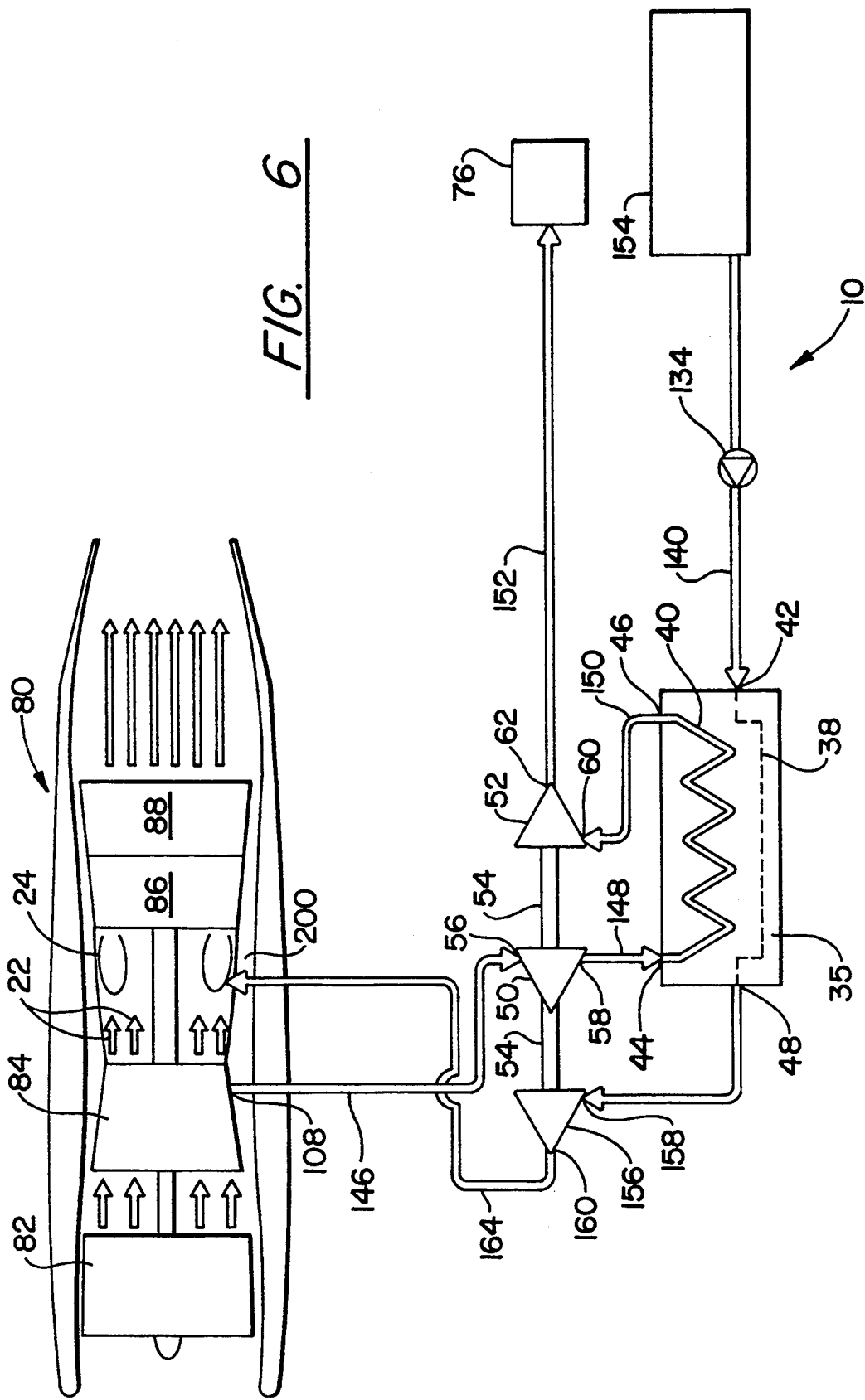
FIG. 6 is a schematic view of the components of the sixth embodiment of the method of the present invention for a vehicle powered by a turbofan gas turbine engine.

A sixth embodiment of the method of the present invention is shown in FIG. 6. In addition to the elements shown in FIG. 5, the sixth embodiment includes a second auxiliary turbine 156 connected to the auxiliary compressor 52 by the auxiliary shaft 54 to provide power thereto. The second auxiliary turbine 156 has an inlet 158 and an outlet 160, and the outlet 48 of the first flow path is connected by a second conduit 162 to the inlet 158 of the second auxiliary turbine 156 to deliver the fuel exiting the first flow path 38 thereto. The outlet 160 of the second auxiliary turbine is connected to a seventh conduit 164 which routes the fuel exiting the outlet 160 of the second auxiliary turbine 156 to the combustion section 24 of the engine.

In operation, fuel from the fuel source 154 is pumped by the fuel pump 134 through the first conduit 140, delivered to the inlet 42 of the first flow path of the heat exchanger/reactor 35, and flows through the first flow path 38 thereof. A second portion, that being compressed air from the high compressor 84, is diverted from the high pressure compressor 84 through the high compressor bleed 108. The second portion flowing from the high compressor 84 through the third conduit 146 is delivered to the inlet 56 of the auxiliary compressor 50. The second portion is then compressed in the auxiliary compressor 50, thereby increasing the pressure and temperature of the second portion exiting the outlet 58 of the auxiliary compressor. The second portion is then delivered to the inlet 44 of the second flow path through the fourth conduit 148. Within the heat exchanger/reactor 35, the second portion is cooled simultaneously with the heating of the fuel flowing through the first path 38. The fuel, heated and in contact with a catalyst in the reactor, decomposes in an endothermic reaction. The resultant products of the endothermic reaction within the heat exchanger/reactor 35 are high pressure gaseous fuels which exit the first flow path outlet 48 and are delivered to the inlet 158 of the second auxiliary turbine 156 through the second conduit 162. The high pressure gaseous fuels are expanded through the second auxiliary turbine 156 to extract work energy from the high pressure gaseous fuels and drive the auxiliary compressor 50 therewith. If all of the power extracted from the auxiliary turbine 52 and the second auxiliary turbine 156 is used to drive the auxiliary compressor 50, as shown in FIG. 6, then the source of the high pressure air may be moved to an interstage bleed on the high pressure compressor 84, rather than the compressor exit, thus reducing potential performance impact on the engine 12.

Although this invention has been shown and described with respect to a detailed embodiment thereof, it will be understood by those skilled in the art that various changes in form and detail thereof may be made without departing from the spirit and scope of the claimed invention.

I claim:

1. A method for generating cooled air for cooling components of a vehicle, said vehicle including a heat exchanger having first and second flow paths extending therethrough, each flow path having an inlet and an outlet, and an auxiliary unit having an auxiliary compressor and an auxiliary turbine, said auxiliary turbine connected to said auxiliary compressor by a shaft to provide power thereto, said method comprising:

providing at least one gas turbine engine in said vehicle, said engine having in serial flow arrangement an engine inlet section and a compressor section, said engine inlet section for receiving ambient air and delivering said ambient air to said compressor section, said compressor section for compressing said ambient air thereby producing compressed air a combustor section for mixing fuel with said compressed air and igniting said fuel and compressed air to produce combustion products, a turbine section for expanding said combustion products and driving the compressor section, and an exhaust section for conveying said combustion products from said turbine section and out of said gas turbine engine;

diverting a first portion of said ambient air from said engine inlet section;

delivering said first portion to said auxiliary compressor and compressing said first portion, thereby increasing the pressure and temperature of said first portion exiting said auxiliary compressor:

diverting a second portion of said compressed air from said compressor section;

cooling said second portion while heating said first portion by flowing said first portion to the inlet of said first flow path, flowing said first portion through said heat exchanger, and flowing said first portion out the outlet of said first flow path, and delivering said second portion to the inlet of said second flow path, flowing said second portion through said heat exchanger, thereby simultaneously cooling said second portion and heating said first portion through the transfer of heat energy from said second portion to the first portion, and flowing said second portion out the outlet of said second flow path;

discharging said first portion into said combustion products at said exhaust section; and, using said second portion that has been cooled to cool said components.

2. The method of claim 1 wherein the step of cooling said second portion is followed by the step of delivering said second portion exiting said heat exchanger to said auxiliary turbine and expanding said second portion through said auxiliary turbine, thereby reducing the temperature of the second portion and producing work to drive the auxiliary compressor via said shaft.

3. The method of claim 2 wherein said vehicle is a supersonic aircraft.

4. A method for generating cooled air for cooling components of a vehicle, said vehicle including a heat exchanger having first and second flow paths extending therethrough, each flow path having an inlet and an outlet, and an auxiliary turbine, said auxiliary turbine connected by a shaft to at least one mechanical accessory to provide power thereto, said method comprising:

providing at least one gas turbine engine in said vehicle, said engine having in serial flow arrangement a compressor section having in serial flow arrangement a low pressure compressor and a high pressure compressor, said compressor section for compressing ambient air thereby producing compressed air, a combustor section for mixing fuel with said compressed air and igniting said fuel and compressed air to produce combustion products, a turbine section for expanding said combustion products and driving the compressor section, an exhaust section for conveying said combustion products from said turbine section and out of said gas turbine engine, and a bypass duct extending between the low pressure compressor and the exhaust section;

diverting a first portion of said compressed air from said low pressure compressor;

diverting a second portion of said compressed air, from said high pressure compressor;

cooling said second portion while heating said first portion by flowing said first portion to the inlet of said first flow path, flowing said first portion through said heat exchanger, and flowing said first portion out the outlet of said first flow path and discharging said first portion into said combustion products at said exhaust section, delivering said second portion to the inlet of said second flow path, flowing said second portion through said heat exchanger, thereby simultaneously cooling said second portion and heating said first portion through the transfer of heat energy from said second portion to the first portion, and flowing said second portion out the outlet of said second flow path;

delivering said second portion exiting said heat exchanger to said auxiliary turbine and expanding said second portion through said auxiliary turbine, thereby reducing the temperature of the second portion and producing work to drive the mechanical accessories via said shaft; and using said second portion that has been cooled to cool said components.

5. A method for generating cooled air for cooling components of a vehicle, said vehicle including a heat exchanger having first and second flow paths extending therethrough, each flow path having an inlet and an outlet, and an auxiliary unit having an auxiliary compressor and an auxiliary turbine, said auxiliary turbine connected to said auxiliary compressor by a shaft to provide power thereto, said method comprising:

providing at least one gas turbine engine in said vehicle, said engine having in serial flow arrangement a compressor section having in serial flow arrangement a low pressure compressor and a high pressure compressor, said compressor section, for compressing ambient air thereby producing compressed air, a combustor section for mixing fuel with said compressed air and igniting said fuel and compressed air to produce combustion products, a turbine section for expanding said combustion products and driving the compressor section, an exhaust section for conveying said combustion products from said turbine section and out of said gas turbine engine, and a bypass duct extending between the low pressure compressor and the exhaust section;

diverting a first portion of said compressed air from said low pressure compressor;

diverting a second portion of said compressed air from said high pressure compressor;

delivering said second portion to said auxiliary compressor and compressing said second portion, thereby increasing the pressure and temperature of said second portion exiting said auxiliary compressor;

cooling said second portion while heating said first portion by flowing said first portion to the inlet of said first flow path, flowing said first portion through said heat exchanger, and flowing said first portion out the outlet of said first flow path and discharging said first portion into said bypass duct, delivering said second portion to the inlet of said second flow path, flowing said second portion through said heat exchanger, thereby simultaneously cooling said second portion and heating said first portion through the transfer of heat energy from said second portion to the first portion, and flowing said second portion out the outlet of said second flow path; and, using said second portion that has been cooled to cool said components.

6. The method of claim 5 wherein the step of cooling said second portion is followed by the step of delivering said second portion exiting said heat exchanger to said auxiliary turbine and expanding said second portion through said auxiliary turbine, thereby reducing the temperature of the second portion and producing work to drive the auxiliary compressor via said shaft.

7. The method of claim 6 wherein said vehicle is a supersonic aircraft.

* * * * *